(12) United States Patent
Landa et al.

(10) Patent No.: US 6,637,574 B2
(45) Date of Patent: Oct. 28, 2003

(54) TRANSMISSION/CASING ASSEMBLY WITH TORQUE DISTRIBUTING DEVICE

(75) Inventors: David Landa, Pensacola, FL (US); Roy Baker, Atmore, AL (US)

(73) Assignee: Alto Products Corp., Atmore, AL (US)

( * ) Notice: Subject to any disclaimer, the term of this patent is extended or adjusted under 35 U.S.C. 154(b) by 0 days.

(21) Appl. No.: 10/002,305

(22) Filed: Nov. 28, 2001

(65) Prior Publication Data

US 2003/0098217 A1 May 29, 2003

(51) Int. Cl.$^7$ ................................................ F16D 13/68
(52) U.S. Cl. ...................................... 192/70.2; 192/115
(58) Field of Search ............................. 192/70.19, 70.2, 192/85 AA, 115; 188/71.5, 73.37, 359.1

(56) References Cited

U.S. PATENT DOCUMENTS

| | | | |
|---|---|---|---|
| 1,683,806 A | * | 9/1928 | Richards, Jr. ................ 192/115 |
| 3,191,735 A | | 6/1965 | Wavak |
| 3,574,366 A | * | 4/1971 | Thostenson .............. 403/359.5 |
| 3,757,907 A | | 9/1973 | Crossman et al. |
| 3,760,921 A | | 9/1973 | Gillespie |
| 4,301,904 A | | 11/1981 | Ahlen |
| 4,356,901 A | | 11/1982 | Koehler et al. |
| 4,640,294 A | | 2/1987 | Ordo |
| 4,697,684 A | | 10/1987 | Maycock et al. |
| 4,989,708 A | | 2/1991 | Gaggermeier |
| 5,439,087 A | | 8/1995 | Umezawa |
| 5,617,941 A | | 4/1997 | Takahashi et al. |
| 5,937,985 A | | 8/1999 | Dover et al. |
| 6,044,948 A | | 4/2000 | Okada et al. |

FOREIGN PATENT DOCUMENTS

| | | | | |
|---|---|---|---|---|
| DE | 2608348 A1 | * | 9/1976 | |
| JP | 59-86716 A | * | 5/1984 | ................ 192/70.2 |

* cited by examiner

Primary Examiner—Richard M. Lorence
(74) Attorney, Agent, or Firm—Stephen E. Feldman, PC

(57) ABSTRACT

An improvement in a motor vehicle transmission/casing assembly where an end pressure plate of a clutch plate assembly, is positioned on a surface of an hydraulic piston located in the casing of the transmission/casing assembly. Spaced externally extending splines on the pressure plate are positioned in correspondingly spaced channels in the interior casing wall, for arresting the pressure plate from rotation. A loosely fitted buffer member or liner is positioned in each channel between the periphery of the externally extending splines and the walls of the channel for intercepting contact between the spline of the pressure plate and the wall of the channel. A groove in a circumference of the interior wall of the casing, supports a snap ring which transverses each channel and blocks the buffer member, positioned in the channel, from slipping out of the channel. The contact intercepted by the buffer member is absorbed by the mass of the buffer member and transmitted to the walls of the channel over a substantially larger contact area than that of the contact between the buffer member and the spline, thus preventing damage to the casing wall.

6 Claims, 1 Drawing Sheet

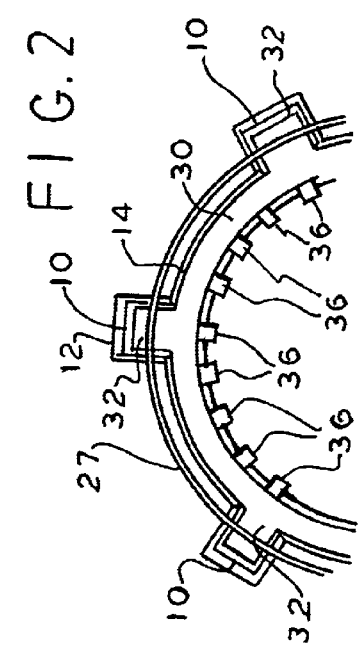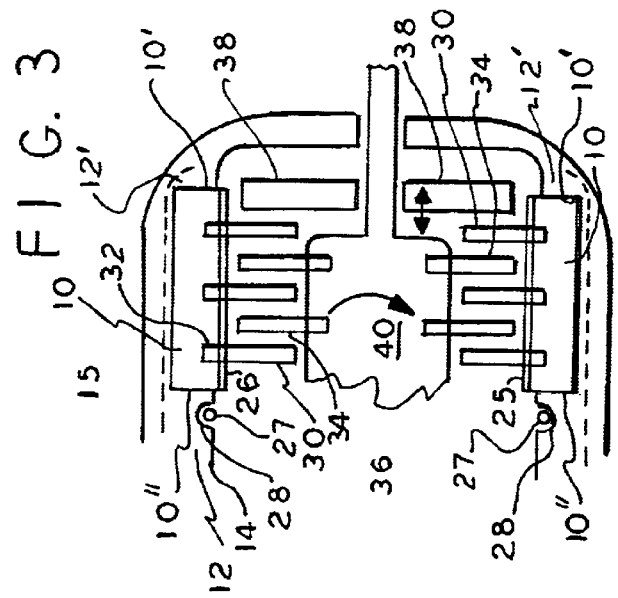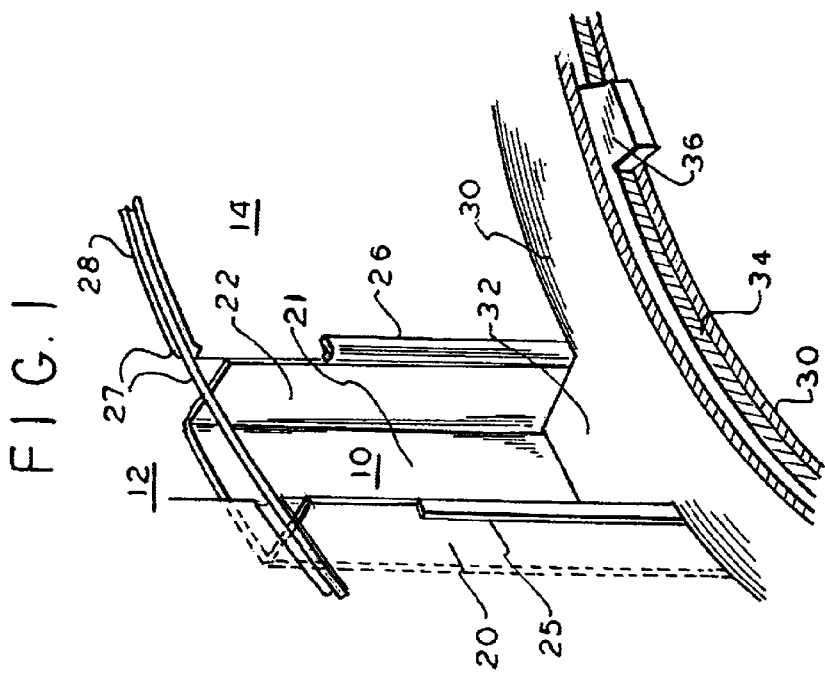

TRANSMISSION/CASING ASSEMBLY WITH TORQUE DISTRIBUTING DEVICE

BACKGROUND OF THE INVENTION

1. Field of the Invention

This invention relates to contact or impact force distribution devices. In particular this present invention is a force distributing device inserted between an impact applying surface and an impact receiving surface for intercepting the impact and distributing the impact over a larger surface.

2. Prior Art

In the contemporary manufacture of motor vehicles, a transmission with clutch assembly is used to transmit power and direction to the drive wheels of the motor vehicle, the power being generated by an engine or a motor. A casing, which covers the transmission and becomes a transmission/casing assembly, provides a friendly work environment for the transmission. Within the friendly work environment, the transmission, which includes a clutch plate assembly, is subjected to several forces, such as heat, pressure and rotational or torque forces. Some of these forces are imparted to the casing providing the friendly work environment surrounding the transmission. Buffer elements such as bearings, plates and rings are selectively positioned between the transmission and the casing to insulate the casing from application of some of these forces that may cause damage to the casing. The function of the casing is to contain the work friendly environment about the transmission while the transmission does the actual work of transmitting power and direction of that power from the engine or other power supply to the drive wheels of the vehicle. The transmission parts such as gears, shafts, plates and accessory elements are, for the most part, fabricated from strong, hard metal, such as steel, for example. The casing, which is defined by a relatively large envelope, is normally fabricated from a less strong, less hard material such as a compound of aluminum, for example. Not only is the casing fabricated from a softer material and easier to fabricate than the elements of the transmission but the casing material is substantially less expensive. This reduces substantially the over-all cost of a complete transmission/casing assembly.

As is well known, steel has a much higher wear resistance than the wear resistance of the aluminum compound used for fabricating a casing for retaining the work environment for a steel component transmission, which it surrounds. Part of the transmission assembly is a plurality of clutch plates which includes flat ring plates with external splines, normally called pressure plates, interposed with flat ring plates with internal splines, normally called friction plates. This plurality of plates is subjected to torque. The torque is imparted to the interior walls of the casing by the external splines on the pressure plates. The external splines on the pressure plates extend.into channels in the interior wall of the casing. The purpose for extending the external splines into the channels of the casing is for arresting the externally splined pressure plates from rotation. The internal splines of the friction plates connect to the transmission. This arrangement is employed in a transmission and casing assembly manufactured by the General Motors Corporation and identified as a Power Glide (TM) transmission. The pressure plate with extending splines is usually fabricated from a spring steel and may be from approximately 0.0675 of an inch to 0.2025 of an inch in thickness. The pressure plate/friction plate assembly, or clutch plate assembly is supported on the upper flat surface of an hydraulic cylinder or piston in the interior of the casing. In its finction as a clutch assembly, the externally splined pressure plates are held stable, that is, arrested from rotating at all times. This is accomplished by providing a plurality of spaced, recessed channels about the periphery of the interior of the casing, each channel extending both above and below the upper surface of the hydraulic piston. The externally extending splines of the pressure plates are positioned in the channels and captured, arresting the pressure plate from rotating. The internal splines of the friction plates extend into slots in the transmission and rotate with the transmission when the hydraulic piston is relaxed, that is, there is no application of pressure or compression force on the clutch plate assembly, so that the pressure plates are stable and the friction plate, spaced between the pressure plates, rotate with the transmission. When the hydraulic piston is exerted, the piston presses against the clutch plate assembly, and the pressure plates and friction plates are pressed together, applying a rotational force or torque to the pressure plates. In arresting the pressure plates from rotation by holding the externally extending splines in the channels of the interior of the casing, the rotation energy or torque is imparted to the walls of the channels of the casing by the splines making a striking contact with the walls of the recessed channels in the casing. Continued striking contact between the external splines of the pressure plates and the walls of the channels in the casing, damage the casing. Damage to the casing leads to destruction of the casing with loss of the friendly work environment for the transmission. Loss of the friendly work environment leads to destruction of the transmission.

SUMMARY OF THE INVENTION

The present invention provides an improved motor vehicle transmission/casing assembly in which a buffer element, for intercepting and distributing energy, is interposed between a torque driven element and the casing of the transmission. The torque driven element is the externally extended spline on the pressure plate of the clutch plate assembly. The part of the casing assembly by which the energy is intercepted is the wall of the channel into which the external spline of the pressure plate extends. The buffer element is interposed between the exterior of the spline in contact with the wall of the casing and the wall of the casing. The buffer element is preferably fabricated from a very hard material, such as spring steel, for example while the casing of the transmission is fabricated from a substantially soft material such as aluminum, for example. The buffer element intercepts energy from the external splines of the torque driven pressure plate of the clutch assembly, receiving the energy in a small area of the buffer element. The buffer element absorbs the energy and distributes the energy throughout its mass and transfers or delivers the distributed energy to the casing over a substantially large area of the casing. The buffer element, in its preferred embodiment, takes the form of a loose liner which covers a portion of the interior walls of the channel in the casing, particularly the portion of the walls in the channel, extending from a position in the casing above the level, in the casing, where the top pressure plate of the clutch plate assembly lies, to below the surface of the hydraulic piston in relaxed position in the interior of the casing. The channel terminates, at its low end, at a point in the casing which is somewhat below the level of the surface of the hydraulic piston, with the piston in relaxed position. Each flat ring plate with the external splines, or pressure plate, is normally fabricated from spring steel having a thickness of from 0.0675 of an inch to 0.2025 of an inch. The buffer element is preferably fabricated from spring steel having a thickness of 0.015 of an inch. A spring steel to spring steel contact is made when a torque is applied to the clutch plate assembly. This contact is made at a very small area on the buffer element. When the buffer element transfers the energy of the contact to the interior surface of the casing, the transfer is made over a substantially large surface of the casing. The positioning of the external splines in the buffer element hold the buffer member in the channel of the casing. The lower end of the channel, below the position of the upper surface of the piston, is terminated just below the level of the top of the piston, when the piston is relaxed. This channel termination keeps the buffer element from sliding in the direction of the piston, here assumed to be the lower direction in the casing. In order to keep the buffer element in position in the channel, that is to keep the buffer element from sliding out the channel, upwardly, a groove is made in the interior wall of the casing, which approximates the level of the top of the buffer element. A snap ring is engaged in the groove and prevents the buffer element from moving up the channel. This combination keeps the buffer element in position in the channel in the interior of the casing, holding the buffer element relatively loosely in the channel.

The present invention provides an improved transmission/casing assembly with an energy distribution member, which receives energy, in the form of torque, absorbs the energy, distributing the energy throughout the mass of the energy distribution member and transfers the energy over a larger surface to surface contact than originally received. This distribution and transfer of torque by a relatively loosely retained buffer element, avoids damage to the assembly casing due to constant contact between the external splines of the pressure ring of the clutch plate assembly and the wall of the internal channel arresting the pressure ring from rotation, when the pressure plate of the clutch plate assembly is subjected to a torque.

BRIEF DESCRIPTION OF THE DRAWINGS

FIG. 1 is a representation of the invention showing a buffer member positioned in a channel of a casing, the buffer member held in position by an externally extending spline of a pressure plate of a clutch plate assembly and a snap ring in a groove in the wall of the casing;

FIG. 2 is a diagrammatic representation of part of the invention assembly, looking into a motor vehicle transmission casing; and FIG. 3 is a diagrammatic representation of part of a motor vehicle transmission in part of a casing showing the relationship of various members of the improved transmission/casing assembly.

DETAILED DESCRIPTION OF THE INVENTION

Throughout the drawings identical elements and parts represented in the drawings are identified with identical call out numbers. Attention is directed to FIGS. 1, 2 and 3 in which a buffer element or member 10 is represented positioned in a channel 12 in the interior wall 14 of a casing 15 of a motor vehicle transmission/casing assembly. The buffer element 10 includes three (3) walls 20, 21 and 22 and an open wall facing the interior of the casing. Along at least part of the outer edge of each of the walls 20 and 22 are lips 25 and 26. Each lip extends transverse to the wall to which it is attached and away from the respective wall. The lips 25 and 26 serve to grip the interior surface of the wall 14, preventing the mass of the buffer element 10 from being driven against the back wall of the channel 12. Preferably, the external width of the side walls 20 and 22 of the buffer element 10 approximate the depth of the channel 12, without exceeding the depth. The external width of the back wall 21 of the buffer element 10 approximates the width of the channel 12, without exceeding the width. The lips 25 and 26 extend over the surface of the interior wall and maintain the buffer element in loose, fitted engagement in the channel 12.

The bottom end 12' of the channel 12 in the wall of the casing degenerates into the wall of the casing at a point below the top surface of the hydraulic cylinder or piston 38 when the piston is in relaxed mode. The upper end of channel 12 fades into the open interior of the casing. Preferably, the length of the buffer element 10 is sufficiently long so that when the buffer element 10 is in the channel 12 and the bottom end 10' of the buffer element is stopped at the receding channel at 12', the upper end of the buffer element will extend over or above the upper surface of the uppermost pressure plate in the clutch plate assembly, when the piston 38 is in activated mode. FIG. 3 represents elements of the clutch plate assembly and hydraulic piston when the piston is in relaxed mode.

In order to keep the buffer element 10 from slipping out the upper end of the channel 12 an upper buffer element stop is provided. Although several buffer element stops may be used, such as bridging the channel or designing a short channel, for example, preferably, a groove 28 is provided in the interior wall of the casing which follows a circumference of the interior wall. The groove 28 is located just above the upper end 10' of the buffer element 10 when the buffer element 10 is in the channel 12 and the lower end 10' of the buffer element is stopped in the channel at the end 12' of the channel 10. The groove 28 is sufficiently large in depth to seat a snap ring. A snap ring 27 is seated in the groove 28 so that the snap ring 27 is positively retained in the groove and when the snap ring is retained in the groove, a portion of the width or thickness of the snap ring 27 extends out of the groove 28. When buffer element is in the channel 12, held in the channel by the externally extending splines 32 of the pressure plates 30, and the lower end 10' of the buffer element 10 is stopped at the channel end 12', and the snap ring 27 is seated in the groove 28, the buffer element 10 will be retained in the channel 12 between the periphery of the externally extending splines 32 and the walls of the channel in a loose, fitted liner condition.

The purpose of positioning the spline 32 in the channel 12 of the casing 15 is to hold or retain the pressure plate 30 from rotating. The friction plate 34 includes internally extending splines 36 which extend into contact with the transmission 40. The friction plate 34, located between pressure plates 30 and 30' (See FIG. 1) rotates with the transmission 40 while the pressure plates are held stable, that is, from rotating. When the hydraulic piston 38 is activated, the piston drives against the most adjacent pressure plate, driving the clutch plate assembly to a stop (not shown) above the uppermost pressure plate. The clutch plate assembly is pressured together, the friction plates applying a torque or rotation energy against the pressure plates attempting to drive the pressure plates rotationally. However, the pressure plates are arrested from rotating by the externally extending splines 32 in the channel 12. As is well known in the art this action stops rotation of the transmission.

Normally the steel splines 32 would transfer the torque or rotation energy to the aluminum compound walls of the channel 12, however, the buffer element 10 disposed between the aluminum compound wall of the channel 12 and the steel spline 32 intercepts and absorbs the energy from the spline. The loosely fitted buffer element distributes the energy essentially throughout the mass of the buffer element and transfers the distributed energy to the walls of the channel, over a much larger surface area than the area in which the energy was received. This is the function of the loose, fitted buffer element. The pressure plate, including the extending spline is normally fabricated from a spring steel of approximately 0.125 of an inch to 0.375 of an inch in thickness. Preferably, the buffer element is fabricated from a spring steel of approximately 0.015 of an inch in thickness.

The channel in the interior of the casing is represented as substantially rectangular with an open wall, an open upper end and a fading lower end. The channel could be limited at its upper end or have a stop means across the channel, at its upper end, so long as the buffer element fits loosely in the channel. If the channel is limited or includes a stop means, other than illustrated in the preferred embodiment, the groove and snap ring would not be needed. This would be an alternate structure of the invention. With substantially rectangular walls defining the channel, as represented herein, the buffer element is represented in rectangular configuration. Channels of a motor vehicle transmission casing may be in some other geometry and the buffer element would then follow substantially the geometry of the channel. Generally, the buffer element serves as a loose, fitted liner for the walls of the channels used for arresting the pressure plate and is disposed between the walls of the channel and the periphery of the externally extending splines of the pressure plate.

In the foregoing description of the invention, referenced to the drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustration of the invention are by way of example, and the scope of the invention is not limited to the exact details shown, represented or described.

Having now described a preferred embodiment of the invention, in terms of features, discoveries and principles, along with certain alternative construction and suggested changes, other changes that may become apparent to those skilled in the art may be made, without departing from the scope of the invention defined in the appended claims.

What is claimed is:

1. An improvement in a motor vehicle transmission/casing assembly where a casing of said transmission/casing assembly includes a hydraulic cylinder having an interior shoulder in a plane that is perpendicular to a longitudinal axis of a motor vehicle transmission of said transmission/casing assembly and said casing further includes a plurality of spaced channels along interior walls of said casing, each channel defined by walls in said casing, each channel of said spaced channels being substantially transverse to said interior shoulder and terminating at a plane below said interior shoulder, and a pressure plate means, of a clutch plate assembly, said pressure plate means having externally extending splined members, and is supported on said interior shoulder between said casing and said transmission wherein a spline member of said spline members of said pressure plate are positioned in said spaced channels on a basis of one spline member of said spline members of said pressure plate in one channel of said spaced channels, respectively, said improvement comprising:

a buffer means interposed between said walls of said channel and a spline member of said pressure plate means, for intercepting an energy transmitted by said spline member to a wall of said walls of said channel and for distributing said energy throughout a mass defining said buffer means and for transmitting said energy to said walls over an extended surface of said mass of said buffer means;

wherein said interior walls of said casing includes a groove means following a circumference of said interior walls for seating a snap ring, and a snap ring means seated in said groove means for limiting movement of said buffer means along said channel.

2. An improvement in a motor vehicle transmission/casing assembly as in claim 1 wherein said buffer means includes a back wall, a first side wall extending from a first edge of said back wall and a second side wall extending from a second edge of said back wall, with common ends of said back wall and said first wall and said second wall open.

3. An improvement in a motor vehicle transmission/casing assembly as in claim 1 wherein said buffer means includes a back wall, a first side wall extending from a first edge of said back wall and a second side wall extending from a second edge of said back wall, with common ends of said back wall and said first wall and said second wall open; and a third wall opposite said back wall is an open wall.

4. An improvement in a motor vehicle transmission/casing assembly as in claim 1 wherein said buffer means includes a back wall, a first side wall extending from a first edge of said back wall and a second side wall extending from a second edge of said back wall, with common ends of said back wall and said first wall and said second wall open;

a third wall opposite said back wall is an open wall; and each end wall, defined by meetings of each end respectively of said back wall and said first wall and said second wall, is open.

5. An improvement in a motor vehicle transmission/casing assembly as in claim 1 wherein said buffer means includes a back wall, a first wall extending from a first edge of said back wall and a second wall extending from a second edge of said back wall and a third wall opposite said back wall being an open wall; and a first end wall defined by a meeting of the same extremes of said back wall and said first wall and said second wall, said first end wall being at least partially closed and connecting with common ends of said back wall and said first wall and said second wall.

6. An improvement in a motor vehicle transmission/casing assembly as in claim 1 wherein each channel of said plurality of spaced channels includes an end thereof which fades into said interior walls of said casing and each said channel includes;

a stop means limiting passage through said channel for limiting movement of said buffer means along said channel.

* * * * *